United States Patent [19]

Träubel et al.

[11] Patent Number: 5,342,556
[45] Date of Patent: Aug. 30, 1994

[54] MICROCAPSULES MADE OF ISOCYANATES WITH GROUPS CONTAINING POLYETHYLENE OXIDE

[75] Inventors: Harro Träubel, Leverkusen; Jürgen Weisser, Dormagen; Helmut Reiff, Leverkusen, all of Fed. Rep. of Germany

[73] Assignee: Bayer Aktiengesellschaft, Leverkusen, Fed. Rep. of Germany

[21] Appl. No.: 941,491

[22] Filed: Sep. 8, 1992

[30] Foreign Application Priority Data

Sep. 16, 1991 [DE] Fed. Rep. of Germany ....... 4130743

[51] Int. Cl.$^5$ .................. A01N 25/28; B01J 13/16
[52] U.S. Cl. .................. 264/4.7; 424/497; 428/402.21; 503/215; 514/963
[58] Field of Search .................. 264/4.7; 428/402.21; 424/497

[56] References Cited

U.S. PATENT DOCUMENTS

| | | | |
|---|---|---|---|
| 3,810,209 | 5/1974 | Bahnsen | 95/86 |
| 3,886,085 | 5/1975 | Kiritani et al. | 264/4.7 |
| 4,076,774 | 2/1978 | Short | 264/4 |
| 4,193,889 | 3/1980 | Baatz et al. | 428/402.21 |
| 4,230,809 | 10/1980 | Heinrich et al. | 521/65 |
| 4,324,817 | 4/1982 | Dahm et al. | 428/402.21 X |
| 4,379,071 | 4/1983 | Schnöring et al. | 264/4.7 |
| 4,428,983 | 1/1984 | Nehen et al. | 264/4.7 X |
| 4,663,377 | 5/1987 | Hombach et al. | 524/196 |
| 4,738,898 | 4/1988 | Vivant | 428/402.21 |
| 4,847,152 | 7/1989 | Jabs et al. | 428/402.21 |
| 5,000,955 | 3/1991 | Gould et al. | 424/497 |

FOREIGN PATENT DOCUMENTS

| | | |
|---|---|---|
| 2251381 | 10/1971 | Fed. Rep. of Germany . |
| 2341113 | 8/1973 | Fed. Rep. of Germany . |
| 2220304 | 5/1974 | France . |
| 2412346 | 12/1978 | France . |
| 1436798 | 5/1975 | United Kingdom . |

*Primary Examiner*—Richard D. Lovering
*Attorney, Agent, or Firm*—Sprung Horn Kramer & Woods

[57] ABSTRACT

Microcapsules can be prepared in an energy-saving manner by using a polyisocyanate which consists exclusively or partially of reaction products of isocyanates having a functionality of 2 or more with polyethylene oxide alcohols.

13 Claims, No Drawings

MICROCAPSULES MADE OF ISOCYANATES WITH GROUPS CONTAINING POLYETHYLENE OXIDE

The present invention relates to microcapsules obtained by the interfacial addition process using isocyanates with groups containing polyethylene oxide.

It is known to prepare microcapsules, e.g. for carbonless paper, by means of an interfacial addition process. In this process a dye, present as a leuco compound, and an at least bifunctional isocyanate are dissolved in a hydrophobic liquid, this hydrophobic mixture is emulsified in water which generally contains a stabiliser, i.e. an agent acting as a protective colloid (e.g. partially saponified polyvinyl acetate), and frequently contains an emulsifier, i.e. an agent for lowering the surface tension, and then a polyamine is added which is capable of reacting with the isocyanate. A polyaddition reaction then takes place at the interfaces of the emulsified hydrophobic droplets and a polyurethane-urea wall forms around the hydrophobic droplets. Finally, it is often necessary to carry out an extensive aftertreatment at elevated temperature. Such processes are described for example in German Offenlegungsschrift 3 202 551, European Published Specification 0 050 264 and U.S. Pat. No. 4,193,889.

The production of the smallest possible capsules by these processes requires an extensive emulsification technique e.g. using high-speed energy-intensive stirring systems.

It has hitherto been possible to prepare capsules with average diameters of less than 5 μm only with extreme difficulty.

German Offenlegungsschrift 3 635 821 has disclosed microcapsules prepared using an aromatic isocyanate with at least 2 isocyanate groups and an alkyl or alkoxy group having at least 6 C atoms. The preparation of such microcapsules again requires an extensive emulsification technique and an extensive aftertreatment at elevated temperature.

The object of the present invention is to provide microcapsules in whose preparation it is also possible to obtain small capsules with low emulsification expenditure.

Microcapsules have now been found which are characterised in that the isocyanates used for their preparation are reaction products of at least bifunctional isocyanates with polyethylene oxide alcohols. Preferred isocyanates to be used according to the invention are reaction products of isocyanates having a functionality of 3 or more with polyethylene oxide alcohols, in which the polyethylene oxide alcohol radical is bonded via an urethane group.

A process for the preparation of microcapsules has also been found in which the material to be encapsulated and a polyisocyanate are dissolved in a hydrophobic solvent. This hydrophobic mixture is continuously or discontinuously emulsified in water and then a polyamine is added which is capable of reacting with the isocyanate, the said process being characterised in that the polyisocyanate used consists exclusively or partially of reaction products of isocyanates having a functionality of 2 or more with polyethylene oxide alcohols.

Polyisocyanates to be used according to the invention can be obtained for example by reacting aliphatic, cycloaliphatic and/or aromatic isocyanates, preferably aliphatic and/or cycloaliphatic isocyanates, having a functionality of at least 2, preferably of 3 or more, with a polyethylene oxide alcohol.

Examples of possible isocyanates for such a reaction are:

a) Triisocyanato(cyclo)alkyl isocyanurates of the formula

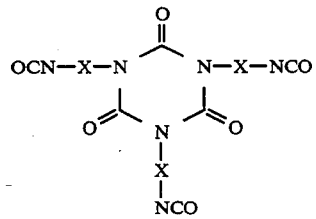

in which are identical or different alkylene or cycloalkylene radicals, and mixtures thereof with higher homologues containing more than one isocyanurate ring. Such isocyanurates can have e.g. an NCO content of 10 to 30% by weight and an average NCO functionality of 3 to 3.5.

b) Polyisocyanates having biuret groups, with aliphatically bonded isocyanate groups, especially tris(6-isocyanatohexyl)-biuret and tris-isocyanatoisophoronyl-biuret and mixtures thereof with higher homologues. Such isocyanates can have e.g. an NCO content of 18 to 22% by weight and an average NCO functionality of 3 to 3.5.

c) Polyisocyanurates having urethane and/or allophanate groups, with aliphatically or cycloaliphatically bonded isocyanate groups, such as those which can be obtained for example by reacting excess amounts of hexamethylene diisocyanate with polyhydric alcohols. Such isocyanates can have e.g. an NCO content of 12 to 20% by weight and an average NCO functionality of 3.

d) Bis (isocyanatohexyl) oxadiazine-trione.

When a reaction product of the isocyanate d) with a polyethylene oxide alcohol is used for microencapsulation, the polyamine can react, to form the capsule wall, with free NCO groups and/or, with $CO_2$ elimination, with the oxadiazine-trione ring, which is a capped isocyanate.

Examples of possible polyethylene oxide alcohols for the reaction with the at least bifunctional isocyanates are any ethoxylation products of monovalent and/or polyvalent low-molecular substances containing active H atoms, for example ethoxylation products of alcohols or amines, especially ethoxylation products of methanol, n-butanol, cyclohexanol, 3-methyl-3-hydroxymethyloxetane, phenol, ethylene glycol, propylene glycol, aniline, trimethylolpropane and/or glycerol.

The polyethylene oxide alcohols preferably contain at least one polyether chain having at least 6, for example 6 to 70, preferably 15 to 60, ethylene oxide units. The polyether chain here is preferably made up only of ethylene oxide units, although it may contain other alkylene oxide units as well, for example up to 40% by weight of propylene oxide units (based on all the alkylene oxide units present).

Monohydric polyethylene oxide alcohols are preferred.

Isocyanates having a functionality of at least 2, better still 3 or more, can be reacted with polyethylene oxide alcohols in proportions such that a reaction product (=polyisocyanate) is formed which still has an average of at least 1.8 NCO groups per molecule. This reaction generally proceeds particularly well at elevated temperature, e.g. at 50° to 130° C.

Microcapsules according to the invention can be prepared discontinuously using polyisocyanates containing for example 0.1 to 100% by weight of the reaction products of at least bifunctional isocyanates with polyethylene oxide alcohols. This amount is preferably 0.5 to 100% by weight and particularly preferably 5 to 50% by weight. For the continuous preparation of microcapsules according to the inventions there can be used for example polyisocyanates which contain 0.1 to 20% by weight, preferably 0.3 to 10% by weight and particularly preferably 0.7 to 7.5% by weight of the reaction products of at least bifunctional isocyanates with polyethylene oxide alcohols. When using polyisocyanate containing less than 100% by weight of reaction products of at least bifunctional isocyanates with polyethylene oxide alcohols, it is possible to include other at least bifunctional isocyanates in the mixture. These other isocyanates can be e.g. isocyanates conventionally used in the preparation of microcapsules by the interfacial addition process, for instance aliphatic, cycloaliphatic and/or aromatic isocyanates, preferably aliphatic and/or cycloaliphatic isocyanates, having a functionality of 2 to 6, preferably of 2 to 3, for example bis-(isocyanatohexyl)-oxadiazine-trione, tris-(isocyanatohexyl)- biuret or tris-(isocyanatohexyl) isocyanurate, xylylene diisocyanate, hexamethylene diisocyanate, isophorone diisocyanate and bis-(isocyanatohexyl)-uretdione.

Polyfunctional isocyanates with a relatively high vapour pressure can be used, if appropriate, in the form of so-called prepolymers, i.e. reaction products with polyhydric alcohols, e.g. trimethylolpropane. Such prepolymers have a lower vapour pressure, contain little or no monomer and are easier to handle than the monomers of polyfunctional isocyanates with a relatively high vapour pressure.

The other components required for the preparation of capsules, namely the material to be encapsulated, the hydrophobic solvent, the aqueous phase and the polyamine, can correspond to the state of the art.

Examples of possible materials to be encapsulated are perfume oils, plant protection agents, reactive adhesives and pharmaceuticals. However, it is preferable to use dyes present in the leuco form, producing microcapsules for use in the carbonless paper sector.

Examples which may be mentioned of dyes present in the leuco form (=so-called colour formers) are triphenylmethane compounds, diphenylmethane compounds, xanthene compounds, benzoxazine compounds, thiazine compounds and spiropyran compounds, mixtures of dyes in the leuco form also being of interest. Hydrophobic solvents which may be mentioned are: chlorinated biphenyl, chlorinated paraffin, cottonseed oil, groundnut oil, palm oil, tricresyl phosphate, silicone oil, dialkyl phthalates, dialkyl adipates, partially hydrogenated terphenyls, alkylated biphenyl, alkylated naphthalene, diaryl ethers, aryl alkyl ethers and more highly alkylated benzene, as well as any mixtures of these hydrophobic solvents and mixtures of one or more of these hydrophobic solvents with kerosene, paraffins and/or isoparaffins. Examples of polyamines which may be mentioned are aliphatic primary and secondary diamines and polyamines.

The proportions of the individual components for the preparation of microcapsules can also correspond to the state of the art. For example, the polyamine in question can be used in a stoichiometric proportion relative to the isocyanate. The hydrophobic phase can contain for example 0.1 to 10% by weight, preferably 1 to 8% by weight, of material to be encapsulated, 1 to 25% by weight, preferably 4 to 18% by weight, of polyisocyanates, and hydrophobic solvents to make up to 100% by weight. The weight ratio of the hydrophobic phase to the aqueous phase can be for example 10:90 to 60:40, preferably 30:70 to 50:50.

The aqueous phase can contain stabilisers, i.e. agents acting as protective colloids and/or viscosity-enhancing agents. Examples of such agents are gelatin, polyvinyl alcohols, partially saponified polyvinyl acetate and carboxymethyl cellulose. Such agents can be present for example in amounts of 0.05 to 5% by weight, based on the aqueous phase. In general it is advantageous to bring the microcapsule formation to completion at a moderately elevated temperature.

Microcapsules according to the invention can be prepared in conventional dispersion apparatuses or emulsification apparatuses.

This gives an aqueous slurry, also called a microcapsule dispersion, which contains the material to be encapsulated, with a solvent for the latter, in microencapsulated form.

Starting from a slurry containing microencapsulated dyes in the leuco form, a batch of carbonless paper can be produced by applying the slurry, if appropriate after the addition of a binder and/or other auxiliaries, to a base paper in a manner known per se to give a coated back paper, and laying this on a coated front paper, which is coated with a layer containing a developer for the colour former.

The microcapsules according to the invention have a number of surprising advantages: They can also be prepared in the form of very small capsules, e.g. capsules with average diameters of 1 to 10 μm. The emulsification step consumes substantially less energy than hitherto, i.e. the preparation of microcapsules of a particular size consumes less energy than hitherto, or smaller microcapsules are obtained with the same energy as hitherto. Emulsifiers are not required and stabilisers can also be omitted in some cases. Where appropriate, the aftertreatment to the formation of microcapsules can be carried out at a lower temperature and/or for a shorter time than hitherto, or can also be totally dispensed with in some cases.

The microcapsules according to the invention can be prepared by continuous and discontinuous processes, inclusive the emulsion required for this purpose, which emulsion consists of an oily phase which contains the polyisocyanate to be used according to the invention and of an aqueous phase.

The polyisocyanates to be used according to the invention remarkably reduces the energy necessary for continuously or discontinuously preparing such an emulsion: This means, among other matters, that according to the invention when continuously preparing the emulsion the throughput per time unit can be remarkably increased at constant energy supply and even at reduced energy supply without causing a rise in particle size of the prepared microcapsules.

EXAMPLES

The same commercially available emulsification device was used in each of Examples 1 to 10, 13, 15, 16 and 17. The speeds indicated in these examples therefore correspond directly to the relative energy consumption.

The size of the hydrophobic droplets in the emulsion and the size of the microcapsules in the finished microcapsule dispersion are practically identical.

EXAMPLE 1 (COMPARATIVE EXAMPLE)

45.1 g of bis-isocyanatohexyl-oxadiazine-trione were dissolved in 364.9 g of a colour former solution consisting of 350.3 g of solvent mixture (60% by weight of chlorinated hydrocarbon, 40% by weight of aliphatic hydrocarbon) and 14.6 g of a conventional colour former (leuco form of a benzoxazine dye). The resulting solution was emulsified at 30° C. in 506.4 g of a 1% by weight aqueous polyvinyl alcohol solution to give an emulsion with droplets having an average particle size of 6.5 μm. This required a stirrer speed of 10,000 rpm. 83.6 g of a diethylenetriamine solution were then added at room temperature. The concentration of amine solution was such that the number of equivalents of amine introduced with it correspond exactly to the number of equivalents of NCO introduced with the bis-isocyanatohexyl-oxadiazine-trione.

After 2 hours the temperature was gradually raised to 30° C., with stirring, and raised to 35° C. after a further hour; finally it was raised to 60° C. for 4 hours. The formation of urea was then complete and, after stirring for 10 hours, free isocyanate could no longer be detected.

A 41% by weight microcapsule dispersion had been formed which can be coated on to paper in a conventional manner.

EXAMPLE 2 (COMPARATIVE EXAMPLE)

60 g of bis-isocyanatohexyl-oxadiazine-trione were dissolved in 340 g of a colour former solution consisting of a 4% by weight solution of a black-developing leuco benzoxazine dye in diisopropylnaphthalene. The resulting solution was emulsified at 10,000 rpm and 30° C. in 488.5 g of a 1% by weight aqueous polyvinyl alcohol solution to form droplets having an average particle size of 7.5 μm. The interfacial addition was carried out by adding 111.5 g of a 9% by weight aqueous diethylenetriamine solution. The subsequent aftertreatment was as described in Example 1.

EXAMPLE 3 a) 1000 g of a mixture of dimeric and trimeric 1,6-diisocyanatohexane, which consisted essentially of a mixture of bis-(6-isocyanatohexyl)-uretdione and tris-(6-isocyanatohexyl) isocyanurate and had a viscosity of 150 mPa s at 23° C., an NCO content of 21.6% by weight and an average NCO functionality of 2.6, were reacted at 110° C. for 2.5 hours with 80.8 g of a monofunctional polyethylene oxide alcohol based on 3-ethyl-3-hydroxymethyl-oxetane and having a molecular weight of 1210. The reaction product had an NCO content of 19.2% by weight.

b) 60 g of this reaction product was dissolved in 340 g of the colour former solution also used in Example 2 and the resulting solution was emulsified at 10,000 rpm in 493.4 9 of a 1% by weight aqueous polyvinyl alcohol solution. 105 g of a 9% by weight aqueous diethylenetriamine solution were added to the emulsion and the aftertreatment was as described in Example 1.

c) This resulted in an exceptionally finely divided 40% by weight microcapsule dispersion consisting of capsules with an average size of 1.7 μm. The microcapsule dispersion can be coated on to paper in a conventional manner.

EXAMPLE 4

Example 3 was repeated except that the emulsification apparatus was run at only half the speed, i.e. at 5000 rpm. This resulted in a 40% by weight microcapsule dispersion in which the capsules had an average size of 4 μm.

EXAMPLE 5

Example 3 was repeated except that the polyvinyl alcohol solution was simply replaced with a corresponding amount of water, the conditions otherwise remaining unchanged. This resulted in a stable microcapsule dispersion in which the capsules had an average size of 2.7 μm. It can be processed in a conventional manner to a coated back paper.

EXAMPLE 6

Example 5 was repeated except that, after addition of the amine, the mixture was stirred for only 30 minutes at 40° C. This resulted in a capsule dispersion in which the capsules had an average size of 2.8 μm. The capsule walls were found to be impermeable. The dispersion can be processed in a conventional manner to a coated back paper.

EXAMPLE 7

60 g of an isocyanate obtained by reacting 1000 g of a biuret polyisocyanate based on 1,6-diisocyanatohexane (consisting essentially of N,N',N''-tris-(6-isocyanatohexyl)-biuret and higher homologues thereof; NCO content 21.0% by weight; average NCO functionality 2.6) with 80.8 g of the same polyethylene oxide alcohol as in Example 3, at 110° C. for 2 hours, were dissolved in 340 g of a colourformer solution consisting of 326.4 g of solvent (a mixture of 70% by weight of diisopropylnaphthalene and 30% by weight of paraffins) and 13.6 g of colour former also used in Example 1. The resulting solution was emulsified in 494 g of water to give an emulsion with droplets having an average particle size of 2.3 μm. This required a stirrer speed of 10,000 rpm. The reaction with amine was carried out in the same way as in Example 3. The aftertreatment consisted in stirring for 30 min at 40° C. A 40% by weight microcapsule dispersion had then formed which can be coated in a conventional manner on to paper.

EXAMPLE 8

1428 g of a 70% by weight solution of an isocyanatoisocyanurate with an average NCO functionality of 3.3, obtained by the trimerisation of isophorone diisocyanate in an aromatic solvent mixture (NCO content of the solution 11% by weight), were reacted at 110° C. for 2.5 h with 80.8 g of a polyethylene oxide alcohol (based on n-butanol, molecular weight 1145). 83.8 g of the resulting solution (solvent content 23.8 g) were dissolved in 316.2 g of a 4.3% by weight solution of the leuco benzoxazine dye also used in Example 1, in a mixture of 70% by weight of diisopropylnaphthalene and 30% by weight of isoparaffin, and the resulting solution was emulsified at 10,000 rpm in 526 g of water.

The average droplet size was then 2.1μ. After the addition of 73.5 g of a 9% by weight diethylenetriamine solution and stirring for 30 minutes at 40° C., a stable 40% by weight capsule dispersion was obtained which can be processed in a conventional manner to a coated back paper.

EXAMPLE 9

60 g of an isocyanate mixture consisting of 85% by weight of the reaction product of dimeric and trimeric 1,6-diisocyanatohexane and a polyethylene oxide alcohol, described in greater detail in Example 3, and 15% by weight of xylylene diisocyanate (mixture of isomers, NCO content 40% by weight) were dissolved in 340 g of the colour former solution also used in Example 1, and the resulting solution was emulsified at 4000 rpm in 479 g of water. After the addition of 121 g of a 9% by weight aqueous diethylenetriamine solution and stirring for 30 minutes at 30° C., a 40% by weight capsule dispersion was obtained which contained capsules having an average size of 8.5 μm. This dispersion can be processed in a conventional manner to a coated back paper.

EXAMPLE 10

Component A:

The reaction product of dimeric and trimeric 1,6-diisocyanatohexane and a polyethylene oxide alcohol, described in greater detail in Example 3.

Component B:

Tolylene diisocyanate (mixture of isomers) was reacted with trimethylolpropane in a molar ratio of 3:1 and the reaction product was used to prepare a 75% by weight solution in ethyl acetate (NCO content of the solution 12.0% by weight).

A mixture of 30 g of component A and 40 g of component B was dissolved in 330 g of a 5% by weight solution of crystal violet lactone in dimethyl phthalate. The clear solution was emulsified at 5000 rpm and 28° C. in 513 g of a 1% by weight aqueous polyvinyl alcohol solution. The average droplet size was then 3.8 μm. 86.4 g of a 9% by weight aqueous diethylenetriamine solution were added to the emulsion, forming a microcapsule dispersion.

Directly after this a sample of the freshly prepared microcapsule dispersion was trickled on to a sheet of a commercially available clay-based coated front paper. No blue colouration could be observed, even after drying, indicating the presence of sufficiently impermeable capsules.

EXAMPLE 11

A mixture of 30 g of the component A also used in Example 10 and 30 g of a hexamethylene diisocyanate oligomer containing biuret groups (NCO content 23.4% by weight) was mixed with 340 g of a solution consisting of 6% by weight of γ-hexachlorocyclohexane (lindane) and 94% by weight of technical-grade chloroparaffin. The resulting solution was transferred to a vessel containing 600 ml of water, in which it was processed to an emulsion at 25° C. by means of a high-speed stirrer at 1000 rpm. 152 g of a 5% by weight aqueous ethylenediamine solution were then added over 30 minutes, with continued stirring but at a slower speed, and the mixture was subsequently stirred for a further 2 h at 40° C.

This resulted in a 35% by weight microcapsule dispersion with capsules having an average size of 40 μm. This dispersion is suitable for slow release formulations of the insecticide lindane.

EXAMPLES 12–17

The following isocyanates were used in each case in the form of a mixture (one component from groups 1 to 3, one component from groups 4 and 5):

Isocyanate 1: Bis-isocyanatohexyl-oxa-diazine-trione
Isocyanate 2: Tris-isocyanatohexyl-biuret
Isocyanate 3: Tris-isocyanatohexyl isocyanurate
Isocyanate 4: Reaction product of a polyisocyanate with a polyether, as described in detail in Example 6 of EP-A2-0 206 059.
Isocyanate 5: Tris-isocyanato-hexyl isocyanurate which has been rendered hydrophilic, as described in detail in Example 9 of EP-A2-0 206 059.
Isocyanate 6: Solvent-containing reaction product of trimerised isophorone diisocyanate with a polyethylene oxide alcohol, as described in detail in Example 12 of EP-A2-0 206 059.

The following colour formers were used:
Colour former 1: Black-developing leuco dye of the benzoxazine type
Colour former 2: Crystal violet lactone The following hydrophobic solvents were used:
Solvent 1: KMC ®
Solvent 2: Exxsol ® D100S 60 g of each isocyanate mixture were dissolved in 340 g of each colour former solution and the resulting solution was emulsified in 600-x grams of an aqueous phase. X grams of a 9% by weight aqueous diethylenetriamine solution were added to the emulsion, x being selected in each case so that the ratio of the NCO groups introduced to the amine groups introduced was exactly stoichiometric.

The resulting capsule dispersions were subsequently stirred for a total of 30 minutes at 40° C.

Table 1 below shows the details and the size of the capsules in the microcapsule dispersion obtained in each case:

TABLE 1

| Example No. | Isocyanate used Types | Isocyanate used Weight ratio | Colour Former (C.F.) solution | Aqueous phase | Stirrer speed (rpm) | Average capsule diameter (μm) |
|---|---|---|---|---|---|---|
| 12 | 1 and 4 | 1:1 | 4.0% by weight of C.F. 1 57.6% by weight of solvent 1 38.4% by weight of solvent 2 | water only | 1000*) | 50 |
| 13 | 3 and 5 | 1:1 | 4.0% by weight of C.F. 1 96.0% by weight of solvent 1 | water only | 8000 | 5.5 |
| 14 | 2 and 4 | 95:5 | 5.0% by weight of C.F. 2 95.0% by weight of solvent 1 | 1% by weight of aqueous PVA solution | 1000*) | 73 |
| 15 | 2 and 4 | 95:5 | 5.0% by weight of C.F. 2 95.0% by weight of solvent 1 | 1% by weight of aqueous PVA solution | 10,000 | 3.2 |

TABLE 1-continued

| Example No. | Isocyanate used Types | Weight ratio | Colour Former (C.F.) solution | Aqueous phase | Stirrer speed (rpm) | Average capsule diameter (μm) |
|---|---|---|---|---|---|---|
| 16 | 2 and 4 | 1:1 | 5.0% by weight of C.F. 2 95.0% by weight of solvent 1 | only water | 10,000 | 1.7 |
| 17 | 1 and 6 | 90:10 | 5.0% by weight of C.F. 2 95.0% by weight of solvent 1 | 1% by weight of aqueous PVA solution | 10,000 | 3 |

*) stirred with usual laboratory stirrer

EXAMPLES 18–21

(Examples 18 and 19 are for comparison purposes, Examples 20 and 21 are according to the invention).

These Examples refer to the continuous preparation of an oil-in-water emulsion from which a dispersion containing microcapsules can be prepared.

Used Polyisocyanates

Examples 18 and 19: Bis-(isocyanatohexyl)-oxadiazinetrione

Examples 20 and 21: A mixture of 1% by weight of the polyisocyanate prepared according to Example 3a) and 99% by weight of bis-(isocyanatohexyl)-oxadiazinetrione

Used Colour Former Solution 3.6% by weight of crystal violet lactone dissolved in a mixture of 50% by weight of chloroparaffine (type: Meflex ® DA 029) and 50% by weight of dodecylbenzene (type: Marlikan ®).

Used Polyvinylalcohol Solution

1% by weight partially saponified polyvinylacetate (type: Airvol ® 523) dissolved in deionised water.

Used Amine Solution

9% by weight diethylenetriamine dissolved in deionised water.

The colour former solution, the polyisocyanate and the polyvinylalcohol solution were fed into a continuously working emulsification apparatus. Details of the emulsification and the results can be seen from Table 2. The amine solution was added to the emulsion after its leaving of the emulsification apparatus. It is mentioned here only to state all materials used for preparing capsules.

TABLE 2

| | EXAMPLES | | | |
|---|---|---|---|---|
| | 18 | 19 | 20 | 21 |
| | for comparison | | according to the invention | |
| Colour former solution (Kg/h) | 360 | 500 | 500 | 500 |
| polyisocyanate (Kg/h) | 40 | 55.5 | 55.5 | 55.5 |
| polyvinylalcohol solution (Kg/h) | 525.5 | 729.9 | 729.9 | 729.9 |
| amine solution (kg/h) | 74.4 | 103.3 | 103.3 | 103.3 |
| number of revolutions of the emulsification apparatus (min$^{-1}$) | 3245 | 3245 | 3245 | 2910 |
| temperature during emulsification (°C.) | 30 | 30 | 30 | 30 |
| total throughout (Kg/h) | 1000 | 1388.7 | 1388.7 | 1388.7 |
| coverage particle size (μm) | 6.8 | 7.6 | 5.7 | 6.0 |

Examples 18 to 21 illustrate following matters:

At a number of revolutions of the emulsification apparatus of 3245 per minute and at a total throughput of 1000 kg/h with a conventional polyisocyanate there are obtained particles having a size of 6.8 μm (Example 18).

Increasing the total throughput to 1388.7 kg/h and leaving all other parameters unchanged causes an increase of the size of the obtained particles from 6.8 to 7.6 μm (Example 19).

The use of a mixture containing a polyisocyanate to be used according to the invention (instead of a conventional polyisocyanate) causes that at high total throughput the size of the particles goes down from 7.6 to 5.7 μm (Example 20).

The reduction of the energy supplied to the emulsification apparatus (about 10% expressed in numbers of revolutions per minute) and leaving all other parameters unchanged causes an increase in particle size to 6.0 μm (Example 21). Nevertheless this particle size is remarkably smaller compared with the particle size obtained when not working according to the invention.

It is possible to favourably influence up to 3 parameters by using the polyisocyanates to be used according to the invention, namely the energy required for the emulsification, the total throughput and the particle size.

What is claimed is:

1. A process for the preparation of microcapsules, in which the material to be encapsulated and a polyisocyanate are dissolved in a hydrophobic solvent, this hydrophobic mixture is continuously or discontinuously emulsified in water and then a polyamine is added which is capable of reacting with the isocyanate, comprising that the polyisocyanate used consists exclusively of a reaction product of an isocyanate having a functionality of 2 or more with a monohydric polyethylene oxide alcohol.

2. The process of claim 1, in which the polyethylene oxide alcohol contains at least one polyether chain having at least 6 ethylene oxide units.

3. The process of claim 1, in which the material to be ancapsulated consists of perfume oils, plant protection agents, reactive adhesives, pharmaceuticals or dyes present in the leuco form, the hydrophobic solvent consists of chlorinated biphenyl, chlorinated paraffin, cottonseed oil, groundnut oil, palm oil, tricresyl phosphate, dialkyl phthalates, dialkyl adipates, silicone oil, partially hydrogenated terphenyls, alkylated biphenyl, alkylated naphthalene, diaryl ethers, aryl alkyl ethers, more highly alkylated benzene, mixtures of these hydrophobic solvents and/or mixtures of one or more of these hydrophobic solvents with kerosene, paraffins and/or isoparaffins, and the polyamines consists of aliphatic primary and secondary diamines and/or polyamines.

4. The process of claim 1, in which the aqueous phase contains 0.05 to 5% by weight of stabilisers.

5. A process for the preparation of microcapsules, in which the material to be encapsulated and a polyisocyanate are dissolved in a hydrophobic solvent, this hydrophobic mixture is continuously or discontinuously emulsified in water and then a polyamine is added which is capable of reacting with the isocyanate, in which the polyisocyanate used consists partly of a reaction product of an isocyanate having a functionality of 2 or more with a monohydric polyethylene oxide alcohol.

6. The process of claim 5, in which the polyisocyanate used has been obtained by reacting a) a triisocyanato(cyclo)alkyl isocyanurate of the formula

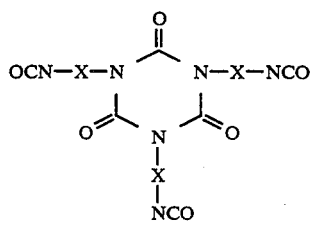

in which
X are identical or different alkylene or cycloalkylene radicals or b) a polyisocyanate having biuret groups, with aliphatically bonded isocyanate groups or c) a polyisocyanurate having urethane and/or allophanate groups, with aliphatically or cycloaliphatically bonded isocyanate groups, and/or d) bis-isocyanato-hexyl-oxadiazine-trione with ethoxylation products of monovalent low-molecular substances containing active H atoms.

7. The process of claim 6, in which a mixture of the triisocyanato(cyclo)alkyl isocyanurate of the given formula with higher homologs was set in.

8. The process of claim 6, in which a mixture of the polyisocyanate having biuret groups with aliphatically bonded isocyanate groups with higher homologs was set in.

9. The process of claim 5, which is carried out discontinuously and in which the polyisocyanate used contains 0.1 to 100% by weight of the reaction product of an at least bifunctional isocyanate with a monovalent polyethyleneoxide alcohol.

10. The process of claim 5, which is carried out continuously and in which the polyisocyanate used contains 0.1 to 100% by weight of the reaction product of an at least bifunctional isocyanate with a monovalent polyethyleneoxide alcohol.

11. The process of claim 5, in which the polyisocyanate used additionally contains isocyanates conventionally used for the preparation of microcapsules by the interfacial addition process.

12. The process of claim 5, in which 0.1 to 30 mol % of the at least bifunctional isocyanate has been rendered hydrophilic by reaction with monovalent polyethylene oxide alcohols.

13. The process of claim 5, in which dyes present in the leuco form are microencapsulated, said dyes consisting of triphenylmethane compounds, diphenylmethane compounds, xanthene compounds and/or benzoxazine compounds.

* * * * *